United States Patent
Van Poucke et al.

(10) Patent No.: US 7,632,888 B2
(45) Date of Patent: Dec. 15, 2009

(54) THERMOPLASTIC FIBER CONCENTRATE METHODS AND ARTICLES

(75) Inventors: Jeroen Van Poucke, Lokeren (BE); Herbert Engelen, Buehl (DE)

(73) Assignee: Dow Global Technologies, Inc., Midland, MI (US)

( * ) Notice: Subject to any disclaimer, the term of this patent is extended or adjusted under 35 U.S.C. 154(b) by 66 days.

(21) Appl. No.: 11/893,449

(22) Filed: Aug. 16, 2007

(65) Prior Publication Data

US 2008/0199689 A1  Aug. 21, 2008

Related U.S. Application Data

(60) Provisional application No. 60/890,002, filed on Feb. 15, 2007.

(51) Int. Cl.
*C08K 3/40* (2006.01)

(52) U.S. Cl. .................. 524/494; 524/502; 524/528; 524/570; 524/582; 524/583; 524/584; 525/70; 428/403; 428/404; 428/405

(58) Field of Classification Search .................. 524/494
See application file for complete search history.

(56) References Cited

U.S. PATENT DOCUMENTS

| | | | |
|---|---|---|---|
| 4,696,765 A * | 9/1987 | Kakizaki et al. | 252/511 |
| 4,960,823 A * | 10/1990 | Komatsu et al. | 525/89 |
| 5,484,835 A * | 1/1996 | Sobajima et al. | 524/494 |
| 5,834,056 A | 11/1998 | Lutz | |
| 6,521,693 B2 | 2/2003 | Saito et al. | |
| 6,756,427 B2 | 6/2004 | Maeda | |
| 6,756,429 B2 | 6/2004 | Webster | |
| 6,844,059 B2 * | 1/2005 | Bernd et al. | 428/357 |
| 7,045,202 B2 | 5/2006 | Tanaka et al. | |
| 2002/0052440 A1 | 5/2002 | Tochioka et al. | |
| 2003/0148083 A1 | 8/2003 | Tanaka et al. | |
| 2006/0094813 A1 | 5/2006 | Warth et al. | |

FOREIGN PATENT DOCUMENTS

| | | |
|---|---|---|
| EP | 0663418 A1 | 12/1994 |
| EP | 0812882 A1 | 12/1997 |
| EP | 1236771 A1 | 9/2002 |
| EP | 1364760 A1 | 11/2003 |
| WO | 2005/111145 A1 | 11/2005 |

OTHER PUBLICATIONS

Dow H734-52RNA, polypropylene Resin, Sep. 2005.
Van Beusichem et al., "Introduction to polymer additives and stabilizers," Ciba Specialty Chemical.
International Search Report, PCT/US2007/074398, Mailing Date Jun. 27, 2008.

* cited by examiner

*Primary Examiner*—Marc S Zimmer
*Assistant Examiner*—Nicole M Buie
(74) *Attorney, Agent, or Firm*—Dobrusin & Thennisch PC

(57) ABSTRACT

A feedstock concentrate material, including a first phase including fibers having a length greater than 5 mm; and a polymeric phase including a first polyolefin having a first melt flow rate; and a second polyolefin having a second melt flow rate. Kits, methods of using and resulting articles including the concentrate are also disclosed.

6 Claims, 1 Drawing Sheet

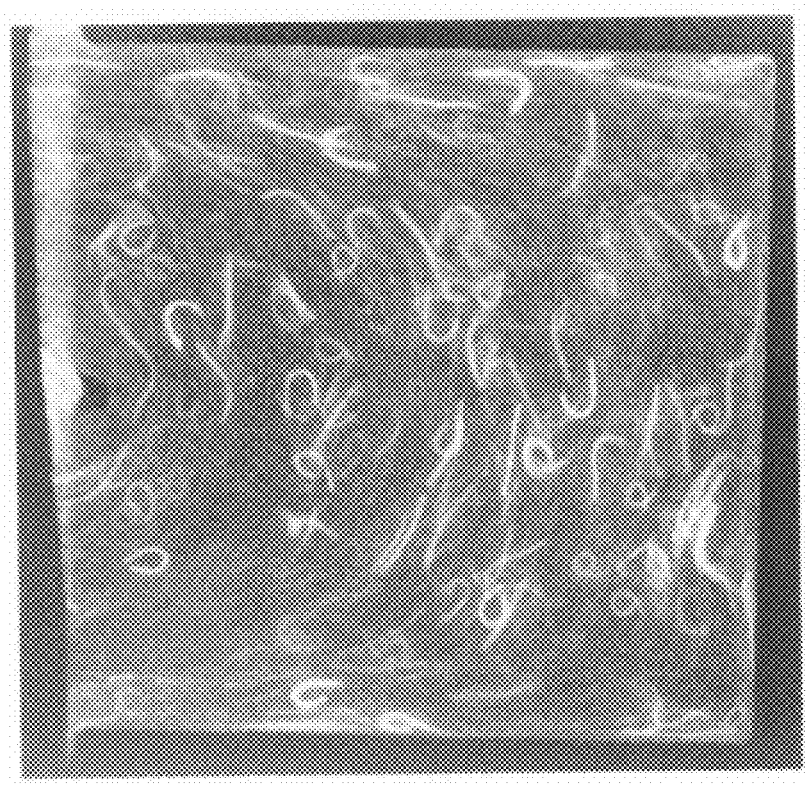
Figure 1
Figure 2
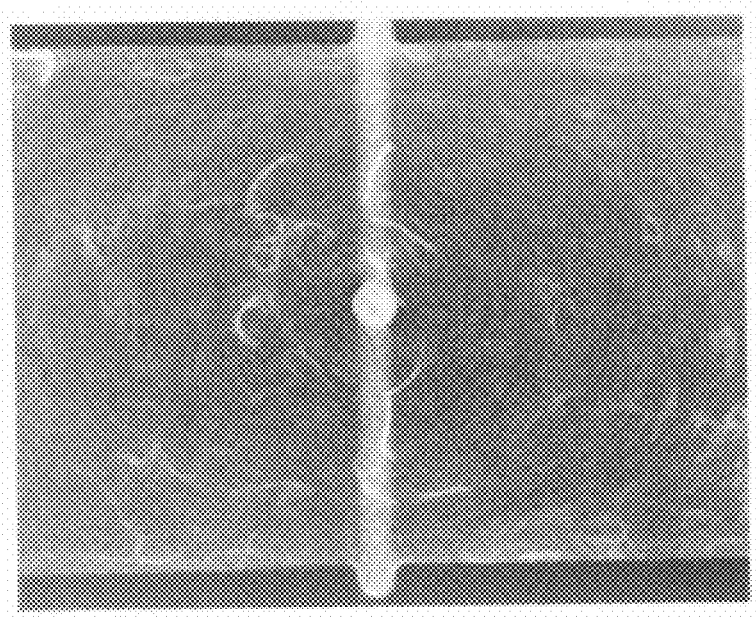

US 7,632,888 B2

THERMOPLASTIC FIBER CONCENTRATE METHODS AND ARTICLES

CLAIM OF BENEFIT OF FILING DATE

The present application claims the benefit of the filing date of U.S. Application Ser. No. 60/890,002, filed Feb. 15, 2007, and PCT Application No. PCT/US07/74398 filed Jul. 26, 2007 (from which this application is a continuation), hereby incorporated by reference.

FIELD OF THE INVENTION

The present invention relates generally to improved fiber reinforced thermoplastic articles, and specifically to thermoplastic articles prepared from a fiber concentrate.

BACKGROUND OF THE INVENTION

The use of filled or reinforced thermoplastics continues to attract attention for use in various applications. One technical issue faced in the art (e.g., for use in automotive or other applications) is the need to provide substantially uniform dispersions. The art has been investigating alternative approaches to the manufacture of high integrity plastics, particularly those in which a glass fiber phase is included.

Examples of efforts to improve fiber dispersions include, without limitation, Webster, U.S. Pat. No. 6,756,429 B2, "Method for Improving Fiber Dispersion and Orientation in Let-Downs of Long Fiber Reinforced Composites," (assigned to Clariant), hereby incorporated by reference. That patent illustrates polyamide matrices incorporating modifiers.

European Patent Application No. EP1 364760A1, "Emission-Reduced Articles from Long Fiber Reinforced Polypropylene," (assigned to Borealis), hereby incorporated by reference, teaches granules containing glass fibers coated first with one molten polypropylene, and then subsequently coated by a second polypropylene.

Published U.S. Pat. No. 7,045,202, "Long Glass Fiber Filler Reinforced Resin Material for Molding, Method for Molding Molded Article, and Molded Article Molded by the Method," (Mazda Motor Corp.), hereby incorporated by reference, addresses a masterbatch having a polypropylene matrix and including grafted polypropylene and glass fibers. See also, Published US Patent Application US20020052440A1, "Long Glass Fiber Filler Reinforced Resin material for Molding, Injection-Molded Article Molded by Injection-Molding the Resin Material, and Method for Molding the Resin Material," (Mazda Motor Corp.) hereby incorporated by reference.

European Patent Application No. EP 0663418 AI, "Mixture of Long Glass Fiber-Reinforced Polypropylene and Polypropylene resin and Moldings Formed Therefrom," (Kawasaki Steel Corp.), hereby incorporated by reference, addresses a mixture that includes glass fibers coupled with grafted polypropylene.

Nothwithstanding efforts to date, there remains a need for improved systems for making fiber reinforced thermoplastic articles, and particularly articles that exhibit good dispersion characteristics, such as for avoiding the formation of fiber clusters, and, particularly fiber clusters that impair other manufacturing process steps (e.g., laser scoring).

There also remains a need for improved fiber-containing feedstock materials that remain substantially in tact during dry handling and processing steps in advance of melting steps.

SUMMARY OF THE INVENTION

The present invention meets one or more of the above needs by providing an improved fibrous concentrate, and particularly a long glass fiber (e.g., an average length greater than 5 mm, and more specifically greater than 10 mm) concentrate, wherein the fibrous phase is present in a polymeric matrix in an amount of at least about 20 percent by weight, and more preferably greater than 50 percent by weight (e.g., about 50 to about 75 percent by weight, such as about 60 percent by weight). The invention is predicated upon the recognition that unique properties are attainable by the manufacture and use of a feedstock concentrate material that includes a first reinforcement phase (e.g., an organic and/or inorganic reinforcement phase, such as one including fibers having an average length greater than 5 or even 10 mm, which phase may be generally axially aligned, randomly oriented or a combination thereof); and a polymeric phase including a first polymer (e.g., a polyolefin such as polypropylene) present in an amount of 50 percent by weight or greater of the polymeric phase and having a first melt flow rate, and a second polymer (e.g., a polyolefin such as polypropylene) present in an amount of less than 50 percent by weight of the polymeric phase, and having a second melt flow rate that is greater than the first melt flow rate.

The present invention also contemplates methods for making the concentrates, articles made from the concentrates, kits that include the concentrate and methods for making the articles.

The concentrates herein offer one or more desirable characteristics, such as attractive and efficient fiber wetting characteristics, fiber dispersion characteristics, or mechanical properties. It is also possible that the concentrates exhibit a relatively low fiber breakage rate during manufacture and/or handling of the concentrate. Articles made with the concentrate are believed to exhibit a relatively low incidence of fiber clustering, if any at all, thereby also yielding a reduced likelihood of material scrap as a result of scoring (e.g., laser scoring) or other processing steps. Other benefits are also potentially achievable, such as the ability to reduce the amount of peroxide-cracked polypropylene as a feedstock material for polypropylene based plastics, and hence a potential for reduced emissions or other undesired gasses or vapors.

DESCRIPTION OF THE DRAWINGS

FIG. 1 is an x-ray micrograph illustrating an expected microstructure of a relatively long glass fiber reinforced plastic outside of the teachings herein.

FIG. 2 is an x-ray micrograph illustrating an expected microstructure of a relatively long glass fiber reinforced plastic according to the teachings herein.

DETAILED DESCRIPTION

Unless otherwise specified, percentages herein are expressed in percent by weight; and melt flow rates herein are at 230° C./2.16 kg, per ISO 1133, and are expressed as g/10 minutes.

In general, the present invention is directed to reinforced plastics, and specifically fiber reinforced thermoplastics. The present invention contemplates an improved fibrous concentrate useful to prepare such reinforced plastics, and particularly a relatively long glass fiber concentrate, wherein the fibrous phase is present in an amount of at least about 20 percent by weight, and more preferably greater than 50 percent by weight (e.g., about 50 to about 75 percent by weight, such as about 60 percent by weight). Unique properties are attainable by the manufacture and use of a feedstock concentrate material that includes a first reinforcement phase (e.g., an organic and/or inorganic reinforcement phase, such as one including fibers having an average length greater than 5 mm, and more specifically greater than 10 mm, which phase may be generally axially aligned, randomly oriented or a combination thereof; and a polymeric phase including a first polyolefin present in an amount of 50 percent by weight or greater (e.g., at least about 65 percent by weight, such as about 75 to about 90 percent by weight) of the polymers in the polymeric phase and having a first melt flow rate, and a second polyolefin present in an amount of less than 50 percent by weight (e.g., below about 35 percent by weight, such as about 10 to about 25 percent by weight) of the polymers in the polymeric phase, and having a second melt flow rate that is greater than the first melt flow rate.

In a particular illustration of the invention, the fibers may be organic, inorganic, or both, and specifically the fibers are relatively long (e.g., an average length greater than about 5 mm or more specifically greater than about 10 mm). A preferred fiber is a glass fiber, which may be coated, or uncoated over substantially all of, or at least a portion of the length of the fiber. The invention is not limited to relatively long glass fibers, and fibers of other lengths, materials, or both may be included, as may be particulates. For example, the fibers may include one or more of a ceramic, carbon, graphite, polymer (e.g., aramid), metal, natural fiber (e.g., hemp, jute, sisal, or the like) or any combination thereof. Thus the fibers may be generally organic, generally inorganic, or a combination of both.

Examples of average fiber lengths in the feedstock concentrate material range from above about 5 mm, and more specifically above about 10 mm, e.g., from about 5 to about 50 mm, or more specifically greater than 10 mm to about 30 mm in length (e.g., about 11 mm to about 25 mm). Preferably, at least about 50 percent by weight of the fibers will be longer than 10 mm, and more preferably at least about 65 (or even about 75) percent by weight of the fibers will be longer than about 10 mm. Fiber diameters typically will range from about 3 to about 100 microns, and more specifically about 5 to about 25 microns (e.g., about 17 microns). It will be appreciated that in resulting final particles (e.g., post-injection molding), fiber lengths may be reduced relative to the initial fiber length. Thus, the above lengths generally refer to fiber lengths as they would exist in the feedstock concentrate material. In final articles, the resulting average fiber length will typically be about 20 to about 80% of the initial length and more specifically about 40 to about 70% of the initial length. Thus, for example, when average fiber lengths are about 11 mm in the feedstock concentrate material, in an injection molded article employing the feedstock concentrate material, the average fiber length will be about 2 to about 9 mm, and more preferably about 5 to 8 mm, and still more preferably about 6 to 7 mm.

One approach is to employ fibers that are pre-treated or otherwise modified to improve one or more of their characteristics. For example, one approach is to coat the fibers with a chemical agent (e.g., a coupling agent, a surface property modifier, a stabilizer or other suitable agent). By way of one specific example, fibers may be treated with a sizing agent for physically and/or chemically improving the tenacity of the subsequent interfacial bond with a polymeric matrix, for protecting the surface of the fibers from damage or both. The sizing will typically include a suitable film forming agent, a coupling agent (e.g., a silane such as an alkoxysilane), and optionally a lubricant or other agent. It may be possible to include for at least part of the sizing a polypropylene-based coupling agent (e.g., including a maleic anhydride grafted polypropylene coupling agent).

Fibers may be provided as individual fibers, e.g., chopped and/or continuous fibers, that are randomly oriented relative to each other, axially aligned relative to each other, woven or any combination thereof, and which may thereafter be dispersed into the polymeric matrix. It is also contemplated that the fibers will be provided in a bundle, by which the fibers are generally axially aligned. One specific approach herein contemplates providing a continuous length of a fiber bundle that is impregnated with the polymeric phase and thereafter cut. In this manner, resulting impregnated materials (e.g., the feedstock concentrate material herein) may have fibers generally sharing a common axial orientation. The invention is not so limited, however, and it is possible that the feedstock concentrate material could include randomly oriented fibers, one or more ordered or aligned orientation portions, a fiber weave, a fiber winding, or any combination thereof.

One example of a suitable fiber is an E-glass fiber roving bundle, e.g., having a generally continuous length, such as that available commercially from PPG FiberGlass Europe under the designation TUFROV® 4599 fiber glass. Glass types other than or in addition to E-glass may be employed, such as S-glass, T-glass, AR-glass, C-glass, R-glass or otherwise.

In general, the invention herein contemplates the manufacture of a shaped article, pursuant to which at least one feedstock, and more specifically at least two feedstock materials (e.g., the feedstock concentrate material herein and a diluent polymer) are combined, such as while in a softened or a molten state, and then introduced into a cavity of a tool for forming a shaped article within the tool cavity. Desirably, the reinforcement phase is introduced into the tool cavity as part of at least one of the feedstock materials. For example, it is introduced as a feedstock concentrate material. Typically the feedstock concentrate will have a relatively high concentration of the reinforcement phase, which will then be diluted in the final article by the presence of at least one diluent polymeric material, such as for forming a resulting material that includes a reinforcement phase concentration of from about 5 to about 50 percent by weight, and more specifically about 20 percent by weight to about 40 percent by weight (e.g., about 20 percent by weight, about 30 percent by weight, or even about 40 percent by weight). The latter diluent polymeric material is introduced along with the feedstock material, such as by mixing the diluent polymeric material feedstock with the feedstock concentrate material, preferably before or during a step of introducing the materials into the tool cavity. Without limitation, the feedstock concentrate material may be dry blended with the diluent polymeric material feedstock and the resulting mixture heated for softening or melting the polymeric phases; the feedstock concentrate material may be blended with the diluent polymeric material feedstock and simultaneously heated for softening or melting the polymeric phases, or a combination thereof. The softened or molten material is introduced into a tool cavity for shaping it and it is solidified or otherwise hardened.

The feedstock concentrate material herein may be any suitable size or shape. In general, it may be elongated (e.g., as a rod), granular, substantially symmetrical in shape about at least one axis, substantially asymmetrical in shape about at least one axis, substantially solid, porous, or any combination thereof. Individual particles of the feedstock concentrate material may have their largest dimension (e.g., length, diameter, height, width or thickness), about 5 mm or larger, more specifically about 8 mm or larger, and still more specifically about 10 mm or longer. For example, it is contemplated that the largest dimension will equal or exceed the average length of reinforcement phase fibers in the feedstock concentrate material. Smaller sizes are also possible as well.

In addition to the reinforcement phase, within the feedstock concentrate material (or possibly external of the feedstock concentrate material, but combined therewith prior to blending with any diluent polymeric material) there will be at least one first polymeric material, particularly a thermoplastic polymeric material, and preferably a combination of at least a first and a second thermoplastic polymeric materials. Though the invention herein is described with specific reference to certain polyolefinic polymers, it is not so limited. For example, though embodiments herein teach the use of a polymeric material (homopolymer, co-polymer, blend or other combination) including polypropylene, other polymers may be employed, such as polyethylenes, polyamides, polycarbonates, polystyrenes, polyesters, or any combination thereof.

A particular preferred approach is to employ an amount of the first polymeric material that is more than the amount of the second polymeric material. For example, it is possible to use as the first polymeric material of the polymeric phase in the feedstock concentrate material a major amount of a first polymer (e.g., a polyolefin such as polypropylene) having a first melt flow rate, and to also employ therewith in the feedstock concentrate material a minor amount of a second polymer (e.g., a polyolefin such as polypropylene) having a second melt flow rate that is higher than the first melt flow rate. For example, the polymeric phase of the feedstock concentrate material including a first polymer (e.g., a polyolefin) present in an amount of at least about 25 percent by weight, and more particularly about 50 percent by weight or greater (e.g., at least about 65 percent by weight, such as about 75 to about 90 percent by weight) of the polymeric phase and having a first melt flow rate, and a second polymer (e.g., a polyolefin) present in an amount of less than 50 percent by weight (e.g., below about 35 percent by weight, such as about 10 to about 25 percent by weight) of the polymeric phase, and having a second melt flow rate that is greater than the first melt flow rate by a factor of at least about 1.5, by a factor of at least about 2.5, or even by a factor of at least 4 (e.g., the second melt flow rate of the second polymer is greater than the first melt flow rate of the first polymer by a factor of about 1.5 to about 5.5, and more specifically about 2 to about 4.5). Thus, within the polymeric phase there will be a higher concentration of the lower melt flow rate material.

The relative amounts of the polymeric material and other ingredients in the feedstock concentrate material relative to the reinforcement phase may vary as desired. One preferred approach is to employ greater than about 20 percent by weight reinforcement phase (e.g., glass fiber) of the feedstock concentrate material, and more specifically about 50 to about 70 percent by weight reinforcement phase (e.g., glass fiber) of the feedstock concentrate material, and still more specifically about 60 percent by weight reinforcement phase (e.g., glass fiber) of the feedstock concentrate material, with the remainder to include or even consist essentially of the polymeric phase.

By way of illustration, it is desirable that the first polymeric material (e.g., a polyolefin such as polypropylene) has a melt flow rate at 230° C./2.16 kg, per ISO 1133 of less than about 150 g/10 minutes, more specifically less than about 100 g/10 minutes, and still more specifically below about 80 g/10 minutes, and event still more specifically below about 60 g/10 minutes. Further, it is desirable that the second polymeric material (e.g., a polyolefin such as polypropylene) has a melt flow rate at 230° C./2.16 kg, per ISO 1133 of at least about 220 g/10 minutes, more specifically at least about 250 g/10 minutes, and still more specifically at least about 300 g/10 minutes.

One example, without limitation, of a suitable first polymeric material of the polymeric phase of the feedstock concentrate material has a melt flow rate in the range of about 40 to about 65 g/10 minutes (e.g., about 52 g/10 minutes), and at least one (and preferably a combination of all) property selected from a flexural modulus per ISO 178 of at least about 1200 MPa (e.g., about 1650 MPa), a tensile strength at yield per ISO 527-2 of at least about 25 MPa (e.g., about 37 MPa), a tensile elongation at yield per ISO 527-2 of at least about 5 percent (e.g., about 9 percent), or a Charpy (notched) impact strength (23° C.) per ISO 179-1/1 eA or at least about 1.5 KJ/m$^2$ (e.g., about 2.5 KJ/m$^2$). Desirably the first polymeric material will be a polypropylene homopolymer, although copolymers (e.g., random and/or block copolymers) that include propylene may be employed also. An example of a suitable commercially available material for use as the first polymeric material of the feedstock concentrate material is H734-52RNA Polypropylene Resin from The Dow Chemical Company.

One example, without limitation, of a suitable second polymeric material of the polymeric phase of the feedstock concentrate material has a melt flow rate in the range of about 300 to about 600 g/10 minutes (e.g., about 450 g/10 minutes). Desirably the second polymeric material will be a polypropylene homopolymer, although copolymers (e.g., random and/or block copolymers) that include propylene may be employed also. An example of a suitable commercially available material for use as the second polymeric material of the feedstock concentrate material is Borflow HL504FB from Borealis.

Within the typical feedstock concentrate material herein, it is contemplated that the relative amounts of the first polymeric material to the second polymeric material (e.g., a first polypropylene having a first melt flow rate and a second polypropylene having a second melt flow rate), will be about 1.1 to about 12 parts of the first polymeric material to about 1 part of the second polymeric material, more specifically about 3 to about 9 parts of the first polymeric material to about 1 part of the second polymeric material, and still more specifically about 5 to about 6 parts of the first polymeric material to about 1 part of the second polymeric material.

It also may be desirable to include in the feedstock concentrate material one or more other ingredients, such as an ingredient selected from one or more of an anti-oxidant, a stabilizer, a colorant, a mold release agent, an anti-static agent, a nucleating agent or any combination thereof. One way to incorporate some or all of these ingredients is to provide the ingredients in a previously compounded ingredients concentrate, e.g., as particulates of the ingredients dispersed in a polymeric matrix, including a carrier polymer. It is possible that such a previously compounded ingredients concentrate particulate will include one or more of an anti-oxidant, a stabilizer, a colorant, a coupling agent, a flame retardant, a mold release agent, an anti-static agent, a nucleating agent, filler, processing aid, or any combination thereof (e.g., a combination including a colorant, an anti-oxidant, and a stabilizer), such ingredients being dispersed (randomly, substantially uniformly or otherwise) in a polymeric matrix that includes a carrier polymer that is substantially the same as or is different from one of the first polymer, the second polymer, or another polymer present in the feedstock concentrate material. By way of specific example, in one embodiment, it is contemplated that one or more of an anti-oxidant (e.g., IRGA- NOX® 1010 antioxidant from Ciba, IRGANOX® PS802 antioxidant), or a combination thereof, a stabilizer (e.g., an active phosphite, such as a compound including tris-(2,4-di-tert-butylphenyl) phosphite such as IRGAFOS® 168 stabilizer from Ciba), a colorant (e.g., carbon black, pigment or combination thereof), or any combination thereof, is compounded with a polyolefinic polymer (e.g., polypropylene) such as the second polymeric material described previously, such as one having a melt flow rate of about 300 to about 600 g/10 minutes (e.g., about 450 g/10 minutes). Any stabilizer may be present in the ingredients concentrate in an amount of up to about 30 percent by weight, or even as much as about 50 percent by weight of the ingredients concentrate, e.g., about 3 to about 15 percent by weight, and more specifically about 5 to about 10 percent by weight. Any antioxidant may be present in an amount up to about 30 percent by weight, or even as much as about 50 percent by weight of the ingredients concentrate, e.g., about 3 to about 15 percent by weight, and more specifically about 5 to about 10 percent by weight of the ingredients concentrate. The colorant may be employed in any suitable amount. For example, if employed, it may range up to about 50 percent by weight from about 5 to about 25 percent by weight (e.g., about 15 percent by weight of the ingredients concentrate). The ingredients will preferably be dispersed in a polymeric carrier for the ingredients concentrate. For example, if employed, a polymer (e.g., a polypropylene, such as the first and/or second polymeric material of the feedstock material concentrate) likely will be present in an amount greater than about 35 percent by weight or even greater than about 50 percent by weight (e.g., about 60 to about 80 percent by weight) of the ingredients concentrate. Thus, it is contemplated that the first and/or second material of the feedstock material concentrate will be introduced into the concentrate, in part or in whole, as a component of the ingredients concentrate.

The above ingredients are but examples of specific ingredients that may be employed herein. Other additives, modifiers, stabilizers and/or fillers may also be employed, either as part of the ingredients concentrate, independent therefrom, or both.

The feedstock concentrate material may further include one or more coupling agents, such as a grafted polypropylene coupling agent, and more specifically, a maleic anyhydride grafted polypropylene coupling agent, such as that commercially available under the trade designation POLYBOND® 3200 coupling agent from Chemtura, or OREVAC™ CA-100 resin from Arkema. The coupling agent may be added to the feedstock concentrate material independent of the ingredients concentrate, or it may be included within the ingredients concentrate. The coupling agent, if employed at all, will be employed in an amount of about 0.5 to about 5 percent by weight of the feedstock concentrate material, and more specifically about 1 to about 3 percent by weight of the feedstock concentrate material.

An example of one ingredients concentrate may have the composition (expressed in approximate parts by weight of the ingredients concentrate) of Table 1.

TABLE 1

| | Preferred | More Preferred | |
|---|---|---|---|
| Ingredient | Concentration | Ingredient | Concentration |
| Carrier Polymer | >35 | BORFLOW ™ HL504FB | 70 |
| Colorant | 0 to 50 | carbon black | 15 |

TABLE 1-continued

| | Preferred | More Preferred | |
|---|---|---|---|
| Ingredient | Concentration | Ingredient | Concentration |
| Stabilizer | 0 to 50 | IRGAFPS ® 168 | 6.7 |
| Anti-Oxidant | 0 to 50 | IRGANOX ® 1010 | 3.3 |
| | | IRGANOX ® PS802 | 5.0 |

An example of a feedstock concentrate material might have the composition (expressed in approximate parts by weight of the feedstock concentrate material) of Table 2.

TABLE 2

| | Preferred | More Preferred | |
|---|---|---|---|
| Ingredient | Concentration | Ingredient | Concentration |
| First Polymer | at least 25 | H734-52RNA | 32.4 |
| Second Polymer | <25 | BORFLOW ™ HL504FB | 4 |
| Ingredients Concentrate | 0.1 to 15 | Table 1 Concentrate | 2.1 |
| Glass fiber | at least 20 | TUFROV ® 4599 | 60 |
| Coupling agent | up to 5 | OREVAC ™ CA-100 | 1.5 |

In general, the feedstock concentrate material herein may be made by a process that involves mixing the ingredients other than the fibers together to form one or more compounds and impregnating a plurality of the fibers with the compounds. Though many suitable processing techniques may be employed, such as melt blending techniques (e.g., melt-extruding), one approach is to impregnate a bundle of fibers, such as by way of a pultrusion process. An example of one such process is described, without limitation, in U.S. Pat. No. 5,834,056, "Process and Apparatus for Fiber Bundle Impregnation" (Institut Fuer Verbundwerkstoffe GmbH), hereby incorporated by reference. In general, a generally continuous fiber bundle is supported and fed to one or more sites at which the polymeric phase of the concentrate (e.g., in a liquid extruded state) is contacted with the fibers. The polymeric phase will thereby impregnate the bundle. Resulting impregnated material can be ground, cut or otherwise sections to form individual pellets, rods or other granules. As can be seen, it is possible that the impregnated fibers will be aligned generally axially with each other, namely in the same general direction.

In general, the feedstock concentrate material herein will be diluted in connection with the manufacture of a shaped article. For example, it is expected that a resulting article will have a fiber content (e.g., a glass fiber) of from about 5 percent by weight of the resulting material to about 50 percent by weight of the resulting material, and more specifically about 20 to about 40 percent by weight of the resulting material (e.g., about 20 percent by weight fiber, about 30 percent by weight fiber, or about 40 percent by weight fiber). Accordingly the amount of any diluent polymer to be employed will be a function of the desired end concentration. For example, without limitation, for an article with a resulting fiber concentration of about 30 percent by weight, about 50 parts by weight of a feedstock concentrate material with about 60 percent by weight fiber will be mixed with about 50 parts by weight of a diluent polymer.

The diluent polymeric material to be mixed (e.g., as a feedstock material) with the feedstock concentrate material may be any suitable polymeric material, and preferably will be a thermoplastic (e.g., a polyolefin, a polyamide, a polycarbonate, a polystyrene, a polyester, or any combination thereof). One particularly preferred material will include polypropylene, and specifically a reactor grade polypropylene. For example, it is desired to employ a polypropylene impact copolymer, a polypropylene homopolymer or a combination thereof, Preferably the melt flow rate of the diluent polymer will be less than about 150 g/10 minutes, and more specifically less than about 100 g/10 minutes, and still more preferably less than about 75 g/10 minutes (e.g., about 30 to about 60 g/10 minutes). The diluent polymer preferably also will exhibit at least one or both of a flexural modulus per ISO 178 of at least about 800, and more preferably at least about 950 MPa (e.g., about 1350 MPa), or a tensile strength at yield per ISO 527-2 of at least about 15 MPa (e.g., about 20 MPa). Without limitation, one specific example of a preferred polypropylene is a polypropylene impact copolymer available commercially from The Dow Chemical Company under the designation C705-44NAHP. Other examples of diluent polymeric materials include one or any combination of homopolymers of propylene, or copolymers including propylene, such as propylene-ethylene random copolymers, propylene-ethylene block copolymers, propylene-EPDM copolymers, or propylene-butene copolymers.

For making an article using the feedstock concentrate material herein, generally, the feedstock concentrate material will be combined with one or more diluent polymeric materials. The step of combining the feedstock materials may take place using any suitable mixing technique, such as dry blending, melt blending, or a combination thereof. For example, one approach is to provide a source of feedstock concentrate material, provide a source of diluent polymeric material, and to deliver both the feedstock concentrate material and the diluent polymeric material (and any other optional ingredients) to a mixing site (e.g., a mixing hopper), at which they are mixed together (such as by dry mixing). Before, during and/or after mixing, the respective feedstock materials may be dosed in their desired amounts, such as by a gravimetric dosing machine, a volumetric dosing machine (e.g., employing a screw meter or a rotating disc), or any combination thereof. Before, during, and/or after mixing, the feedstock materials are heated, particularly to liquefy the polymeric components of the materials. The liquid is shaped and solidified within a cavity of a tool, such as within an injection mold cavity.

In general, suitable art-disclosed techniques may be employed for molding. For example, one or more of the feedstock materials may be dried in an air circulated oven for about 2 to 4 hours at about 80 to about 90° C. The feed zone is maintained at about 190 to about 220° C., with a barrel temperature of about 220 to about 280° C., and a mold temperature of about 20 to about 60° C. The mold optionally may be water cooled. For example, one illustrative profile may realize a temperature difference of about 50° C. from nozzle to feeding area. Screw rotation, dosaging, back pressure and injection speed conditions are selected for achieving a generally homogenous mixture of the feedstock materials. One such protocol might employ a back pressure of about 16 bar, a relatively slow and gentle screw fill (over about 30 to 35 seconds), and an injection time of about 2 to about 6 seconds Following molding or shaping of the articles, they may be subjected to one or more additional secondary operations. For example, they may be flame treated, foamed, bonded, cut, stamped, scored (e.g., by laser, mechanically or otherwise), or otherwise processed.

The teachings herein can be employed to make any of a number of articles. Examples include articles selected from one or more of an instrument panel, a handle, an automotive interior trim panel, a console, a component housing, an airbag door, a map pocket, an ash tray, a tonneau cover, a tray, a console, a seat back, an armrest, a knee bolster, a body shield, a front end carrier, a door module, an under-body shield, an impingement plate, or a cup holder. The articles herein may further include one or more over molded component, insert molded component, laminate layer, coating or other component.

The present invention also contemplates kits that include the feedstock concentrate material, and particularly feedstock concentrate material packaged along with the diluent polymeric material.

Though it is possible that handling steps may be employed for achieving a predetermined segregation and/or orientation of reinforcement phase in the feedstock concentrate material, the finished article prepared therefrom, or both, one approach herein is to employ a selection of materials, processing steps or both such that a substantially uniformly dispersed reinforcement phase is realized, a randomly oriented dispersion is realized or both.

It should be appreciated from the above, that one or more of the polymers used herein as the diluent polymer, the first and/or second polymer of the feedstock concentrate material, or in the ingredients concentrate may be modified for imparting a functional group (e.g., epoxy modified, carboxylic acid modified acid anhydride modified, or any combination thereof, for improving bonding. It is generally contemplated, however, that the embodiments disclosed herein will be substantially free of a modified polymer in at least the polymers of the feedstock concentrate material, if not the other polymers as well.

Further, it is possible that fibers employed herein will include one or more polymeric coatings, such as an inner coating layer of a first polyolefin polymer and an outer coating layer of a second polyolefin polymer. In general, however, the fibers herein prior to contact with the polymeric phase of the feedstock concentrate material will be substantially free of any plural layer polyolefin structure. Moreover, it will be appreciated that the fibers will be exposed to the respective polymers of the feedstock concentrate material, substantially simultaneously during any impregnation step.

The following example illustrates, without limitation, one embodiment in accordance with the teachings herein.

EXAMPLES

A first concentrate is prepared according to the more preferred composition of Table 1. A second concentrate is prepared by impregnating (via pultrusion) a glass fiber bundle with a mixture of the remaining ingredients, according to the composition of Table 2. The resulting pultruded concentrate is dry blended with polypropylene impact copolymer available commercially from The Dow Chemical Company under the designation C705-44NAHP, so that resulting overall glass content is about 20 percent by weight. The material of the resulting molded article is expected to realize the following properties of Table 3 within about 10 percent of the recited values. An estimated or actual melt flow rate of less than about 100 g/10 minutes is realized (e.g., about 50 to about 80 g/10 minutes). Results within about at least about 30, 50 or even about 100 percent of the recited values are also believed possible for overall resulting concentrations of glass at about 30 percent by weight or about 40 percent by weight. For example, at a 30 percent glass concentration, according to the present teachings, the tensile and/or flexural modulus (as described in Table 3) may be about 7000 MPa, and about 9000

MPa for about a 40 percent glass concentration. It will also be appreciated that the below properties may be reduced by 50 percent, 100 percent, or more for resulting materials in instance of relatively low glass concentration levels (e.g., at about 10 percent by weight or even about 5 percent by weight). Further, the values specified in Table 3 are not limited to the material of the example only. Similar values are believed possible for other materials resulting from the teachings herein.

TABLE 3

| Property | Unit | ISO Test Method | value |
|---|---|---|---|
| Density | Kg/m³ | 1183 | 1030 |
| Falling Dart 3 mm @Room Temperature | Total Energy (J) | 6603-2 | 8.2 |
| Charpy edge unnotched @Room Temperature | kJ/m² | 179/1eU | 44.8 |
| Charpy flatwise unnotched @Room Temperature | kJ/m² | 179/1fU | 36.3 |
| Tensile strength at yield 50 mm/min | MPa | 527-2 | 80.3 |
| Tensile elongation at rupture 50 mm/mm | % | 527-2 | 2.2 |
| Tensile modulus | MPa | 527-2 | 4905 |
| Flexural strength | MPa | 178 | 125 |
| Flexural modulus | MPa | 178 | 4712 |

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A feedstock concentrate material, comprising:
   a first phase including fibers having an average length greater than about 5 mm; and a polymeric phase including
   at least 50 percent by weight of the polymeric components of the polymeric phase of a first polyolefin having a first melt flow rate; and
   less than 50 percent by weight of the polymeric components of the polymeric phase of a second polyolefin having a second melt flow rate that is higher than the first melt flow rate;
   wherein the fibers in the first phase include glass fibers, the first polyolefin includes a polypropylene and the second polyolefin includes a polypropylene;
   wherein the feedstock concentrate material further comprises a polypropylene-based coupling agent, and the feedstock concentrate material is in the form of pellets, rods, or granules;
   wherein the fibers in the first phase are aligned generally axially with each other;
   wherein the first polyolefin is a polypropylene having a melt flow rate of less than about 60 g/10 mm, as measured per ISO 1133 at 230° C./2.16 kg, the second polyolefin is a polypropylene having a melt flow rate greater than about 300 g/10 mm, as measured per ISO 1133 at 230° C./2.16 kg, and the first polyolefin is present from about 3 to about 9 parts by weight per 1 part by weight of the second polyolefin.

2. The feedstock concentrate material of claim 1, wherein the fibers are coated with a silane sizing, are substantially uniformly distributed in the blend, or both.

3. A feedstock concentrate material, comprising:
   a first phase including about 50 to about 70 percent by weight of the feedstock concentrate material of glass fibers coated with a silane sizing and having an average length greater than about 10 mm;
   a polymeric phase including a blend of:
   a first polypropylene having a melt flow rate at 230° C./2.16 kg, per Iso 1133 of less than about 60 g/10 mm; and
   a second polypropylene having a melt flow rate at 230° C./2.16 kg, per ISO 1133 greater than about 300 g/10 mm; and
   a maleic anhydride grafted polypropylene coupling agent present in an amount of about 0.5 to about 5 percent by weight of the feedstock concentrate material;
   wherein the polymeric phase includes about 3 to about 9 parts by weight of the first polypropylene to about 1 part by weight of the second polypropylene.

4. A feedstock concentrate material of claim 3, wherein the feedstock concentrate material is in the form of pellets, rods, or granules.

5. A polymeric article comprising a diluent polymer other than the first polypropylene, the second polypropylene or both blended with the feedstock concentrate material of claim 3.

6. The polymeric article of claim 5, wherein the diluent polymer includes a polypropylene having a melt rate of less than about 150 g/10 minutes, as measured per ISO 1133 at 230° C./2.16 kg.

* * * * *